United States Patent
Lance

[19]

[11] Patent Number: 5,860,700
[45] Date of Patent: Jan. 19, 1999

[54] LUMBAR SUPPORT ADJUSTMENT DEVICE

[75] Inventor: Mark Andrew Lance, Pascoe Vale South, Australia

[73] Assignee: Henderson's Industries Pty. Ltd., Australia

[21] Appl. No.: 566,448

[22] Filed: Dec. 1, 1995

Related U.S. Application Data

[63] Continuation of Ser. No. 122,519, Sep. 27, 1993, abandoned.

[30] Foreign Application Priority Data

Mar. 26, 1991 [AU] Australia ................. PK 5283

[51] Int. Cl.$^6$ ........................................ A47C 3/025
[52] U.S. Cl. ........................... 297/284.8; 297/284.2
[58] Field of Search ............... 297/284.4, 284.8, 297/284.2, 452.3

[56] References Cited

U.S. PATENT DOCUMENTS

| | | |
|---|---|---|
| 4,148,522 | 4/1979 | Sakurada et al. ............ 297/284.4 |
| 4,162,807 | 7/1979 | Yoshimura ................ 297/284 |
| 4,425,910 | 1/1984 | Meiller . | 
| 4,565,406 | 1/1986 | Suzuki ................. 297/284 |
| 4,886,316 | 12/1989 | Suzuyama et al. . |

FOREIGN PATENT DOCUMENTS

| | | |
|---|---|---|
| 80449/82 | 8/1983 | Australia . |
| 19524/83 | 3/1985 | Australia . |
| 19816/83 | 4/1985 | Australia . |
| 72609/87 | 11/1987 | Australia . |
| 33650/89 | 10/1989 | Australia . |
| 51266/90 | 11/1990 | Australia . |
| 0 296 938 | 12/1988 | European Pat. Off. . |
| 1274003 | 7/1968 | Germany . |
| 30 45 809 | 7/1982 | Germany . |
| 38 21 018 | 1/1989 | Germany . |
| 11526 | 1/1977 | Japan .................. 297/284.4 |
| 360516 | 11/1931 | United Kingdom ........ 297/284.4 |

*Primary Examiner*—Laurie K. Cranmer
*Attorney, Agent, or Firm*—Evenson, McKeown, Edwards & Lenahan P.L.L.C.

[57] ABSTRACT

A lumbar support adjustment device is disclosed comprising a bracket (11) adapted to slidably restrain a lumbar support belt means (13) adapted to extend between first (12) and second (12') side frames of a seat, said bracket being adapted to be secured to the first side frame and having associated cam means (16) operable to slidably move said belt means between a first and a second position to provide lumbar support adjustment in which said cam means cooperates directly with cam follower means formed in or on said belt means.

49 Claims, 3 Drawing Sheets

LUMBAR SUPPORT ADJUSTMENT DEVICE

This application is a continuation of application Ser. No. 08/122,519, filed on Sep. 27, 1993 now abandoned.

The present invention relates to adjustable lumbar support devices for seats and relates particularly but not exclusively to adjustable lumbar support device for motor vehicle seats.

Adjustable lumbar supports are provided in the seats of motor vehicles to allow adjustment of the firmness of the back rest thus providing for the differing comfort requirements of driver and passenger. Known supports comprise a "waistband" extending between two bracket means fixed within and on each side of the frame of the vehicle seat. On one side of the seat frame, the waistband is pivotally attached to the bracket means in a fixed position by way of a pivot pin. The pivot pin which generally includes a nylon or other bush is fixed in pivotal arrangement by an appropriately formed plate which encircles the pivot pin and bush and terminates in two parallel spaced apart plates. The waistband, inserted between the plates, is fixed by appropriate means such as riveting.

On the other side of the seat frame in known supports, the waistband is again pivotally or otherwise attached to a bracket means in a manner similar to that described hereinabove. However, the bracket means also includes adjustment means to reduce or increase the distance between the ends of the waistband. The shorter the distance between the ends of the waistband, the slacker the back rest of the seat and vice versa.

The adjustment may be provided by forming the bracket in two parts which are hinged or pivotally fixed one being a moveable part which acts as a cam follower. A cam, which may be a continuous or a stepped cam, is operated by an appropriate handle attached to a spindle to permit the desired adjustment of the lumbar support in the back rest by movement of the cam follower which is attached to and therefor moves the belt attached thereto. A lumbar support of this type is described in Australian patent application No. 80449/82.

A further lumbar support adjustment means is disclosed in Australian patent No. 575427 (AU-B-47090/85) which utilises a dual cam mechanism to vary the lumbar support provided by an elastic member extending across the back of the seat.

Each of the above and other known lumbar support adjustment means are complex and require numerous parts, numerous assembly operations and are thus somewhat costly to make and assemble. It is therefore an object of this invention to provide a lumbar support adjustment device and mechanism which is simple and cheap to construct but which still provides simple and reliable lumbar support adjustment.

The present invention therefore provides a lumbar support adjustment device comprising a bracket adapted to slidably restrain a lumbar support belt means adapted to extend between first and second side frames of a seat, said bracket being adapted to be secured to the first side frame and having associated cam means operable to slidably move said belt means between a first and a second position to provide lumbar support adjustment in which said cam means cooperates directly with cam follower means formed in or on said belt means.

The present invention also provides a seat having a seat frame including first and second side frame members in which said seat has lumbar support adjustment means comprising a bracket adapted to slidably restrain a lumbar support belt means extending between the first and second side frames of the seat, said bracket being secured to the first side frame and having associated cam means operable to slidably move said belt between a first and a second position to provide lumbar support adjustment in which said cam means cooperates with cam follower means formed in or on said belt means.

The present invention also provides a lumbar support adjustment device comprising a bracket adapted to slidably restrain a lumbar support belt means adapted to extend between first and second side frames of a seat, said bracket being adapted to be secured to the first side frame and having associated cam means operable to slidably move said belt means between a first and a second position to provide lumbar support adjustment in which said cam means cooperates with cam follower means formed in or on said belt means at or near one end thereof, the other end of said belt means being adapted to be fixed to said second side frame of said seat frame.

The present invention also provides a seat having a seat frame including first and second side frame members in which said seat has lumbar support adjustment means comprising a bracket adapted to slidably restrain a lumbar support belt means extending between the first and second side frames of the seat, said bracket being secured to the first side frame and having associated cam means operable to slidably move said belt means between a first and a second position to provide lumbar support adjustment in which said cam means cooperates with cam follower means formed in or on said belt means at or near one end thereof, the other end of said belt means being fixed to said second side frame of said seat frame.

Preferably the belt slides between a face of the bracket and a plate or disc adapted to constrain the belt in a substantially flat configuration against said face.

The belt means may comprise an integrally formed (synthetic) plastics material belt extending between the first and second brackets in which case the cam means is included within the bracket. Alternatively, the belt means may comprise a (synthetic) plastics material belt fixed at one end to one side frame of the seat and interrupted near the other end by cable means extending between the bracket and the cam means to provide for remote adjustment of the lumbar support.

Preferably the cam means comprises an edge cam having a plurality of discrete cam face steps to provide a plurality of discrete lumbar support adjustment positions. Preferably the cam means is integrally formed on one side of the plate or disc. Alternately the cam means comprises a projection on said disc which interengages with a slot in said belt to cause the belt to move from its first to its second position (and vice versa) on rotation of said disc.

The cam means may be operated manually by way of a handle or lever or alternatively by an electric or other motor means either directly or from a location remote from the bracket.

Other preferred features of the invention will be apparent from the following description of presently preferred constructions of adjustable lumbar support devices and mechanisms.

Preferred embodiments of lumbar support adjustment devices according to the invention will now be described with reference to the accompanying drawings in which FIG. 1 shows a schematic representation of a lumbar support with adjustment means;

FIG. 3a shows a variation of the adjustment means; and

Figure 1:
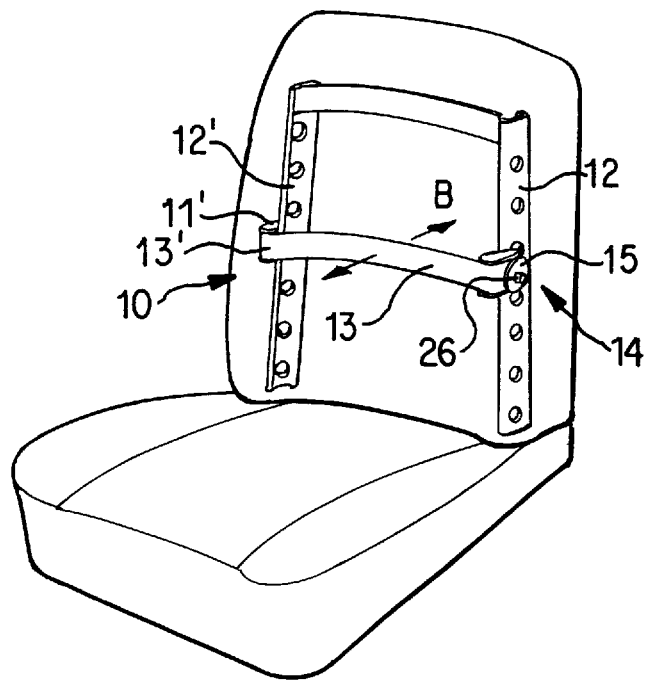
Figure 2:
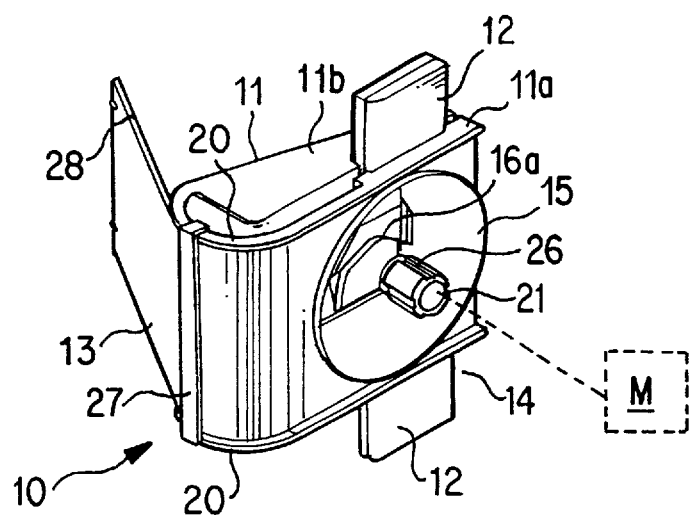
FIG. 2 shows the adjustment means in greater detail.
Figure 3:
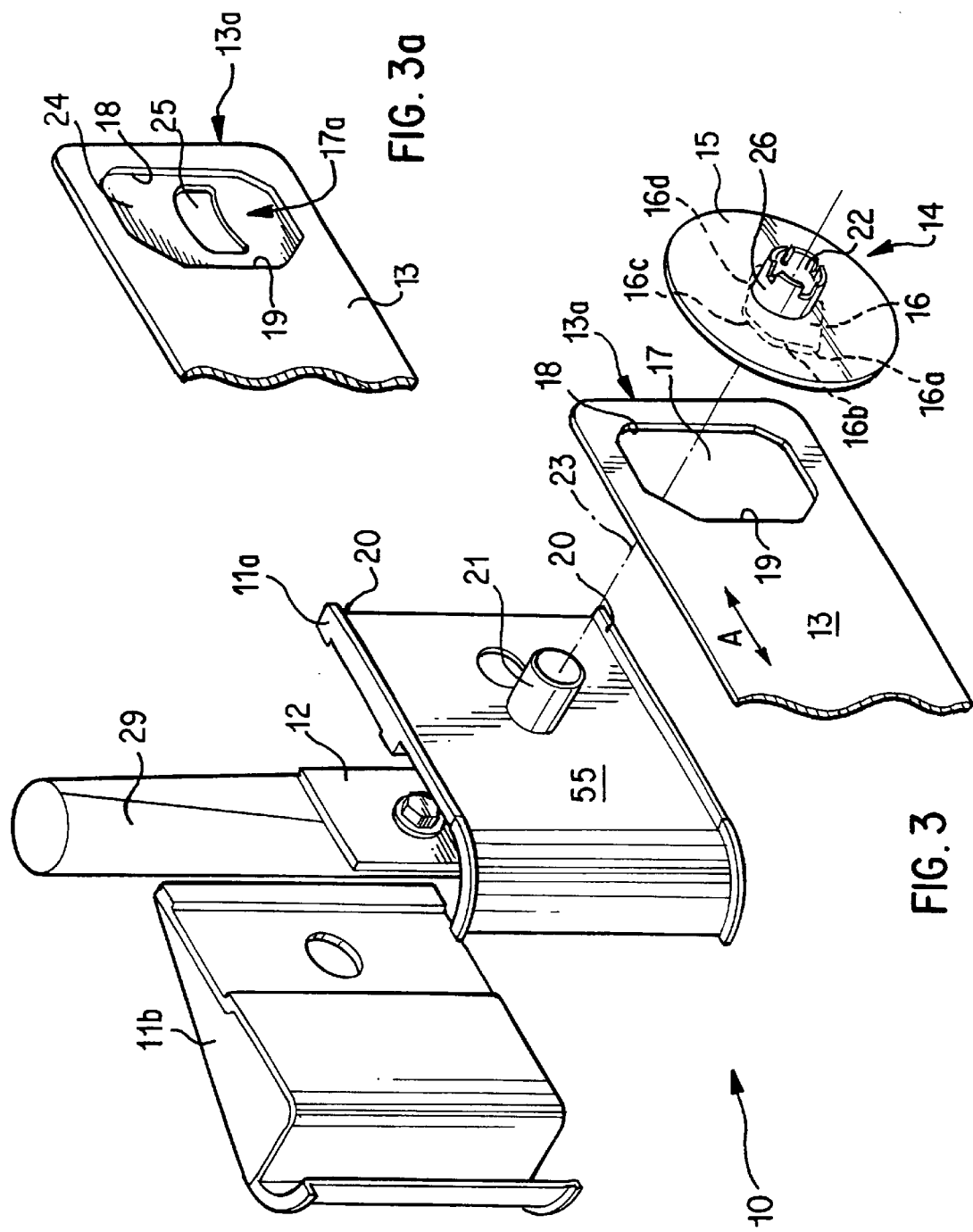
FIG. 3 is an expanded view of the adjustment means of FIG. 2.

Referring to FIGS. 1 to 3 there is shown a lumbar support adjustment device 10 including a bracket 11 adapted to be fixed to the side frame 12 of a seat frame, a lumbar support belt 13 and adjustment means 14. The belt extends from the bracket 11 on one side frame 12 of the seat, across the back of the seat to be fixed via similar bracket 11' to the opposite side frame 12' of the seat.

The adjustment means includes plate portion 15, cam 16 and drive boss 26. The belt 13 includes towards end 13a a hole 17 having edge face 18 which acts as a cam follower in cooperation with cam 16. Bracket 11 includes side flanges 20 to constrain the belt 13 laterally within the assembled device 10. The bracket 11 includes two sections 11a and 11b adapted to be fixed to side frame 12 by any known means.

The other end 13' of the belt 13 may be fixed to side frame 12' by a complimentary shaped bracket 11' wherein the end 13' of the belt is held between the two parts of the bracket 11'. Bracket 11 includes on section 11a a boss 21 to engage with bore 22 through adjustment means 14 to permit rotation of the adjustment means 14 about axis 23. As will be readily apparent, the end 13' of the belt 13 may be affixed to side frame 12' by any convenient means.

As adjustment means 14 is rotated by means of handle or other mechanism such as an electric motor M shown schematically in "dash" lines in FIG. 2, the cam faces (eg. 16 a, 16b, 16c, 16d) of cam 16 cooperates with edge face 18 of the hole 17 in belt 13 to cause the belt to move backwards or forwards as indicated by arrow A depending on the direction of rotation and relative position of operative cam faces 16 a–d. The movement of the belt 13, which is fixed at its other end to the other side frame of a seat, causes a tightening or slackening of the belt across the seat in the lumbar region (in the direction of arrow B) thus providing simple lumbar support adjustment. Edge face 18 of hole 17a of the belt 13 is biased against the cam surface by way of the weight or force applied to the belt 13 by the occupant of the seat. The hole 17a may be cut partially through the belt 13 as shown in FIG. 3a providing thin web 24 to assist with maintaining the belt in the desired configuration, that is with no undue distortion of the shape of the hole 17a. Slot 25 permits movement of the belt 13 in direction A past or over boss 21.

The belt is held firmly between the planar face 55 of the bracket section 11a and the inner face of the plate portion 15 but in a manner which permits the belt 13 to slide between the bracket section 11 and disc portion 15 in response to operation of the adjustment means and cam 16.

The belt 13 is made from polypropylene or polyethylene or any other suitable stiff but flexible textile or other material. The belt may be thicker towards end 13a to provide added strength and rigidly in the area of the "cam follower" hole 17 and may taper to a lesser thickness 28 once outside the constraints of the bracket portion 11a and disc portion 15 of adjustment means 14.

In an alternative the plate 15 may be of rectangular shape adapted to fit between side flanges 20 of the bracket portion 11 a to more fully support belt 13. The disc portion 15 in such case is not fixed to cam 16 or drive boss 26 but boss 26 and cam 16 are free to rotate with respect to the plate and held in place by snap fit engagement of drive boss 26 and handle or other mechanism (not shown).

In a further preferred construction the device may include belt guide means 27 in the form of a strap extending across the bracket section 11a to assist in restraining the belt 13 between the flanges 20.

Figure 4:
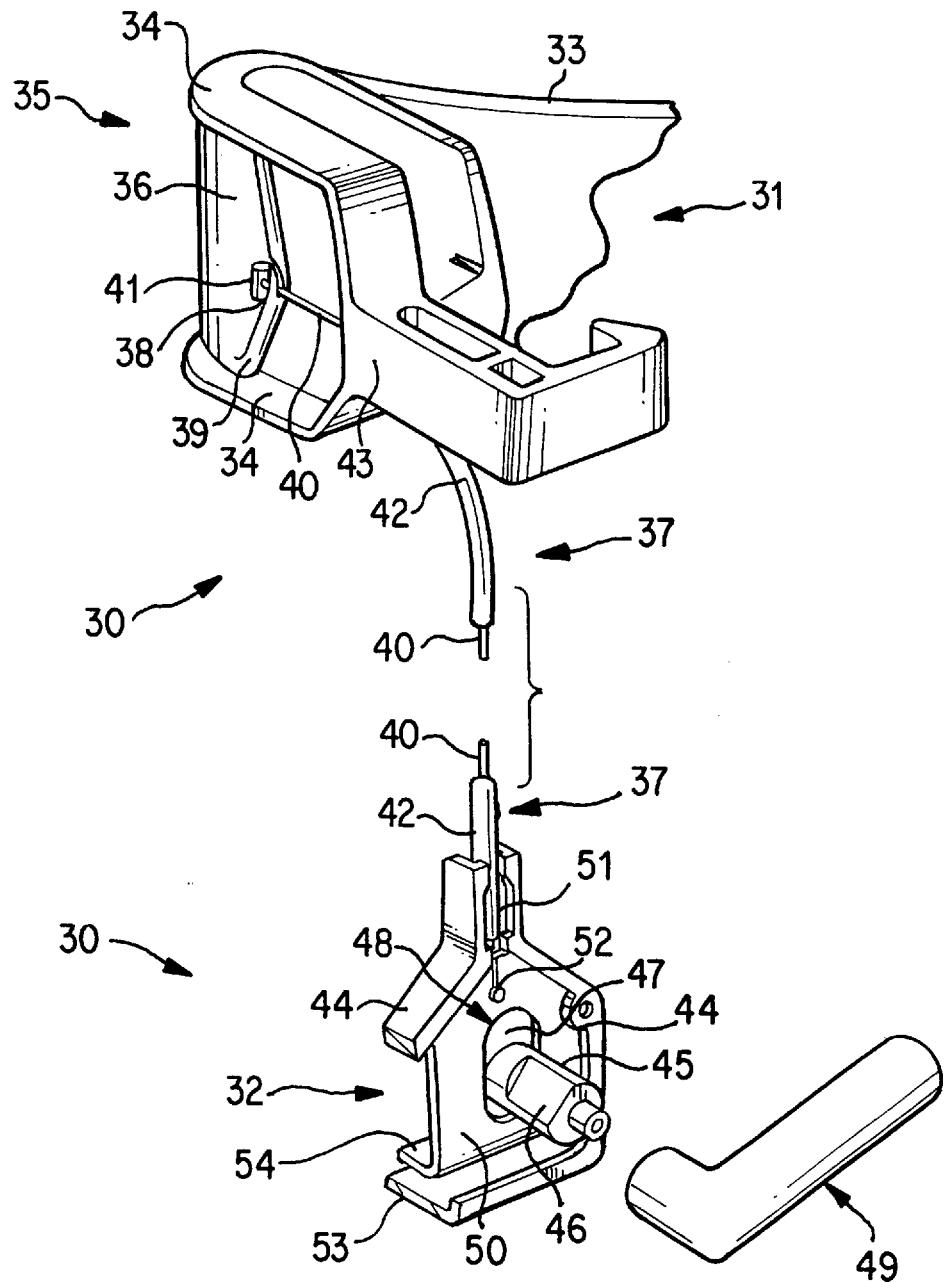
FIG. 4 shows a further variation of lumbar support adjustment means according to the invention.

Referring to FIG. 4, there is shown a further embodiment of lumbar support adjustment means 30 according to the invention including bracket 31 to be fixed to one seat back side frame (not shown) and remote operating mechanism 32 to be fixed at a position such as beside the base of the seat to provide ease of access and operation.

The bracket 31 has belt 33 disposed between flanges 34 to permit slidable movement of the belt 33 around end 35 of the bracket 31. The belt 33 extends across the back of the seat and is fixed at one end to one side frame of the seat (not shown) by any convenient means. The other end 36 of the belt includes attachment means for attachment of cable drive means 37 through hole 38 in the reinforced end portion 39 of the belt 33. The inner cable wire 40 is prevented from detachment from belt 33 by means of end stop 41. Outer cable sleeve 42 is held within the bracket by means of cable sleeve hole 43. The remote operating mechanism 32 which may be fixed at any convenient and ergonomically acceptable location on or near the seat comprises a housing 44 adapted to be fixed to the seat. The housing 44 has a substantially flat shuttle 45 slidably mounted therein and a pivot pin 46 rotatably fixed therein. The shuttle 45 has a slot 48 therethrough adapted to slide backwards and forwards past the pivot pin 46. Pivot pin 46 has cam 47 formed thereon having cam faces (not shown) to cooperate with flange 54 on the end 53 of the shuttle to move the shuttle in response to rotation of the pivot pin by means of handle 49 by abutment of flange 54 against the cam 47. End 50 of the shuttle is connected to the other inner end cable drive means 37, the outer cable sleeve of which is secured in cavity 51 of the housing 44. The inner cable 40 is secured in hole 52 by known means.

It will be seen that rotation of the handle 49 causes linear movement of the shuttle 45 resulting in linear movement of the end 36 of the lumbar support belt 33 with resultant lumbar support adjustment across the back of the seat.

It will be readily understood that the lumbar support belt is biased towards any desired position by the weight or force of the person occupying the seat and held in any desired position by adjustment of the cam follower face against the face of the cam of the adjustment means.

The brackets, housing and belt may be made of any convenient materials and are preferably formed from suitable synthetic plastics materials.

In order to restrain the adjustment mechanism in a particular position particularly when there is no forces applied to the lumbar support by an occupant of the seat, it is possible to form a projection—not shown—(such as a hemispherical dimple) on the face of the cam 16 (FIG. 1, 2 or 3) which abuts against planar face 55. Planar face 55 may include a plurality of corresponding indentations to cooperate with the projection to restrain the mechanism in a particular position. Similar projections and indentations can also be formed on the appropriate parts of the device of FIG. 4 as will be understood from the above.

Whilst we have described particular embodiments of our invention, it will be appreciated by those skilled in the art that many modifications may be made to the embodiments described without departing from the spirit of the invention disclosed.

I claim:

1. A lumbar support adjustment device comprising a bracket adapted to slidably restrain a lumbar support belt adapted to extend between first and second side frames of a seat and to be biased towards a belt support position in use by force from a person occupying the seat, said bracket being adapted to be secured to the first side frame and having an associated cam operable to slidably move said belt between a first and a second position to provide lumbar support adjustment in which said cam cooperates directly with a cam follower provided by one of an edge of a hole formed in said belt or an edge of a recess formed in said belt.

2. A lumbar support adjustment device according to claim 1, wherein the cam is an edge cam having a plurality of discrete cam faces to provide a plurality of discrete lumbar support positions between said first and second positions.

3. A lumbar support device according to claim 2, wherein the cam follower is formed in the lumbar support belt such that said cam follower and said lumbar support belt comprise a single unitary member.

4. A lumbar support device according to claim 3, wherein the lumbar support belt is formed from synthetic plastics material.

5. A lumbar support device according to claim 4, wherein the lumbar support belt is interrupted near one end by a cable extending between the bracket and the cam to provide for remote adjustment of the lumbar support belt.

6. A lumbar support adjustment device according to claim 2, wherein said cam follower is adjacent one end of said belt, and wherein a second opposite end of said belt is adapted to be fixed to said second side frame.

7. A lumbar support adjustment device according to claim 1, wherein the cam follower is formed in the lumbar support belt such that said cam follower and said lumbar support belt comprise a single unitary member.

8. A lumbar support adjustment device according to claim 7, wherein the lumbar support belt is formed from synthetic plastics material.

9. A lumbar support adjustment device according to claim 1, wherein the lumbar support belt is interrupted near one end by cable extending between the bracket and the cam to provide for remote adjustment of the lumbar support belt.

10. A lumbar support adjustment device according to claim 9, wherein said cam follower is adjacent one end of said belt, and wherein a second opposite end of said belt is adapted to be fixed to said second side frame.

11. A lumbar support device according to claim 1, comprising a manually operable handle for moving the cam between respective adjustment positions.

12. A lumbar support device according to claim 1, comprising a motor for moving the cam between respective adjustment position.

13. A lumbar support device according to claim 12, wherein said motor is an electric motor.

14. A lumbar support adjustment device according to claim 13, wherein said cam follower is adjacent one end of said belt, and wherein a second opposite end of said belt is adapted to be fixed to said second side frame.

15. A lumbar support adjustment device according to claim 1, wherein said cam follower is adjacent one end of said belt, and wherein a second opposite end of said belt is adapted to be fixed to said second side frame.

16. A lumbar support device according to claim 1, wherein said lumbar support belt is biased under tension toward said belt support position.

17. A seat having a seat frame including first and second side frame numbers in which said seat has a lumbar support adjustment assembly, comprising a bracket adapted to slidably restrain a lumbar support belt adapted to extend between the first and second side frames of the seat and to be biased toward a belt support position in use by force from a person occupying the seat, said bracket being adapted to be secured to the first side frame and having an associated cam operable to slidably move said belt between a first and a second position to provide lumbar support adjustment in which said cam cooperates directly with a cam follower provided by one of an edge of a hole formed in said belt or an edge of a recess formed in said belt.

18. A seat according to claim 17, wherein the cam is an edge cam having a plurality of discrete cam faces to provide a plurality of discrete lumbar support positions between said first and second positions.

19. A seat according to claim 18, wherein the cam follower is formed in the lumbar support belt such that said cam follower and said lumbar support belt comprise a single unitary member.

20. A seat according to claim 19, wherein the lumbar support belt is formed from synthetic plastics material.

21. A seat according to claim 20, wherein the lumbar support belt is interrupted near one end by a cable extending between the bracket and the cam to provide for remote adjustment of the lumbar support belt.

22. A seat according to claim 20, comprising a manually operable handle for moving the cam between respective adjustment positions.

23. A seat according to claim 21, comprising a motor for moving the cam between respective adjustment positions.

24. A seat according to claim 23, wherein said motor is an electric motor.

25. A seat according to claim 17, wherein the cam follower is formed in the lumbar support belt such that said cam follower and said lumbar support belt comprise a single unitary member.

26. A seat according to claim 17, wherein the lumbar support belt is formed from synthetic plastics material.

27. A seat according to claim 17, wherein the lumbar support belt is interrupted near one end by a cable extending between the bracket and the cam to provide for remote adjustment of the lumbar support belt.

28. A seat according to claim 17, comprising a manually operable handle for moving the cam between respective adjustment positions.

29. A seat according to claim 17, comprising a motor for moving the cam between respective adjustment positions.

30. A seat according to claim 29, wherein said motor is an electric motor.

31. A lumbar support adjustment device comprising a bracket adapted to slidably restrain a lumbar support belt adapted to extend between first and second side frames of a seat and to be biased towards a belt support position in use by force from a person occupying the seat, a cam follower formed in said lumbar support belt such that said cam follower and said lumbar support belt comprise a single unitary member, said bracket being adapted to be secured to the first side frame and having an associated cam operable to slidably move said belt between a first and a second position to provide lumbar support adjustment in which said cam cooperates directly with said cam follower.

32. A lumbar support device according to claim 31, wherein said lumbar support belt is biased under tension toward said belt support position.

33. A lumbar support device according to claim 31, wherein an entirety of said lumbar support belt is flexible.

34. A lumbar support adjustment device according to claim 31, wherein the cam follower is provided by one of an edge of a hole formed in said belt or an edge of a recess formed in said belt.

35. A lumbar support adjustment device according to claim 31, wherein the cam is an edge cam having a plurality of discrete cam faces to provide a plurality of discrete lumbar support positions between said first and second positions.

36. A lumbar support adjustment device according to claim 31, wherein the lumbar support belt is formed from synthetic plastics material.

37. A lumbar support adjustment device according to claim 31, wherein the lumbar support belt is interrupted near one end by cable extending between the bracket and the cam to provide for remote adjustment of the lumbar support belt.

38. A lumbar support device according to claim 31, comprising a manually operable handle for moving the cam between respective adjustment positions.

39. A lumbar support device according to claim 31, comprising a motor for moving the cam between respective adjustment positions.

40. A lumbar support device according to claim 39, wherein said motor is an electric motor.

41. A lumbar support adjustment device comprising a bracket adapted to slidably restrain a flexible lumbar support belt adapted to extend between first and second side frames of a seat and to be biased towards a belt support position in use by force from a person occupying the seat, an entirety of said belt being flexible, said bracket being adapted to be secured to the first side frame and having an associated cam operable to slidably move said belt between a first and a second position to provide lumbar support adjustment in which said cam cooperates directly with a cam follower comprising a portion of said flexible belt.

42. A lumbar support adjustment device according to claim 41, wherein the cam follower is provided by one of an edge of a hole formed in said belt or an edge of a recess formed in said belt.

43. A lumbar support adjustment device according to claim 41, wherein the cam is an edge cam having a plurality of discrete cam faces to provide a plurality of discrete lumbar support positions between said first and second positions.

44. A lumbar support adjustment device according to claim 41, wherein the cam follower is formed in the lumbar support belt such that said cam follower and said lumbar support belt comprise a single unitary member.

45. A lumbar support adjustment device according to claim 41, wherein the lumbar support belt is formed from synthetic plastics material.

46. A lumbar support adjustment device according to claim 41, wherein the lumbar support belt is interrupted near one end by cable extending between the bracket and the cam to provide for remote adjustment of the lumbar support belt.

47. A lumbar support device according to claim 41, comprising a manually operable handle for moving the cam between respective adjustment positions.

48. A lumbar support device according to claim 41, comprising a motor for moving the cam between respective adjustment positions.

49. A lumbar support device according to claim 48, wherein said motor is an electric motor.

* * * * *